UNITED STATES PATENT OFFICE.

HENRY A. GARDNER, OF WASHINGTON, DISTRICT OF COLUMBIA.

PIGMENT.

1,220,973.

Specification of Letters Patent. Patented Mar. 27, 1917.

No Drawing. Application filed February 18, 1915. Serial No. 9,147.

*To all whom it may concern:*

Be it known that I, HENRY A. GARDNER, a citizen of the United States, residing at Washington, in the District of Columbia, have invented certain new and useful Improvements in Pigments, of which the following is a specification.

This invention relates to the preparation of certain novel precipitates available for use as pigments, and specifically such pigments as are not blackened by sulfureted hydrogen, and are not materially altered in color by exposure to light, air, and the ordinary weathering conditions. These precipitates contain in all cases a water-insoluble metallic phosphate; and in the preferred embodiment of the invention, the pigment contains at least two metals, as for instance zinc and barium. Both of these metals may be present in combination with phosphoric acid, or one of them only may be combined with phosphoric acid, the other being combined with sulfur, sulfuric acid or the like, in the form of a water-insoluble salt. The preferred conditions of preparation are such that the two salts or compounds are produced by precipitation in a state of extremely minute subdivision and intimate mixture, or possibly in a state of more or less loose chemical combination.

Certain illustrative examples of the process are as follows, it being understood that the invention is not restricted to the particular materials, or to the proportions of materials, chosen for illustration:—

Example I: Molecular proportions of zinc chlorid and barium chlorid are dissolved in water, and the mixture added to an aqueous solution of phosphoric acid, the latter in sufficient proportion to combine with the total quantity of barium present. To the resulting clear solution, I add an alkaline aqueous solution of a sulfid such as sodium or ammonium sulfid, in molecular proportion to the zinc chlorid present. A white precipitate, which may be regarded as an intimate mixture or combination of zinc sulfid and barium phosphate is formed. This is washed and dried and is then ready for use. This composition may perhaps be represented by the formula $ZnS.Ba_3(PO_4)_2$.

A pigment which is presumably of like composition may be prepared by adding a solution of barium sulfid to a solution prepared by dissolving zinc oxid in phosphoric acid, the latter solution being previously neutralized if desired.

Example II: A solution of zinc sulfate is added to a solution containing sodium phosphate and sodium sulfid until precipitation ceases, and the resulting white precipitate is washed and dried. In case the sodium phosphate and sulfid are present in molecular proportions, the pigment may be represented by the formula $ZnS.Zn_3(PO_4)_2$.

Example III: A solution is prepared containing molecular proportions of sodium phosphate and sodium sulfate, and a solution of barium chlorid is added so long as precipitation ensues. The resulting pigment may be represented by the formula $BaSO_4.Ba_3(PO_4)_2$.

Example IV: Zinc chlorid and barium chlorid are dissolved in water, and added to a solution containing sufficient sodium phosphate for complete precipitation. The pigment formed is a mixture or combination of the phosphates of zinc and barium, and may be represented as $Zn_3(PO_4)_2.Ba_3(PO_4)_2$.

Example V: Lead salts, such as white lead or litharge, are dissolved in phosphoric acid, the solution made neutral if desired, and then precipitated by zinc sulfate, yielding a white pigment which probably consists of lead sulfate and zinc phosphate, $3PbSO_4.Zn_3(PO_4)_2$.

The invention may of course be applied in a great many specific forms other than those above mentioned as illustrative, the essential feature being the formation by precipitation of a water-insoluble phosphate, preferably combined with an insoluble metallic salt (which may or may not be also a phosphate) of another metal, the resulting pigment possessing a high degree of color permanence. Instead of ortho-phosphates, the pyro- and meta-phosphates may be used when the pigments produced therefrom are water-insoluble. The compounds entering into the constitution of the pigments may be present in other than equimolecular proportions.

The dry pigments produced by the above method may be heated to a high temperature and plunged into water in order to make them finely subdivided and to increase their opacity. They may be subjected to other physical treatment to accomplish the same purpose if desired.

My studies of the new pigments have indicated that they possess a materially higher degree of color permanence for outside work than do the pigments consisting essentially of zinc sulfid and barium sulfate. Furthermore, the pigments of the type described in Examples I to IV, inclusive, are not darkened by hydrogen disulfid or sulfur, while even those prepared as in Example V are quite resistant to sulfur compounds.

The pigments prepared according to all the specific examples above given are white in color, but if compounds of other metals, such as copper, manganese, cobalt, nickel, chromium, or iron, are used, the pigments produced will be of varying colors.

I claim:—

1. A pigment containing a metallic phosphate and a metallic sulfid, both substantially insoluble in water.

2. A pigment containing barium phosphate and a metallic sulfid, said sulfid substantially insoluble in water.

3. A pigment containing barium phosphate and zinc sulfid.

In testimony whereof I affix my signature in presence of two witnesses.

HENRY A. GARDNER.

Witnesses:
ETHEL DANIELS,
ROBERT I. HULSIZER.